INVENTOR.
Stanley R. Howard
BY J. Stanley Churchill
ATTORNEY

Nov. 14, 1950 S. R. HOWARD 2,529,732
CONTAINER FORMING MACHINE
Filed April 15, 1947 3 Sheets-Sheet 2
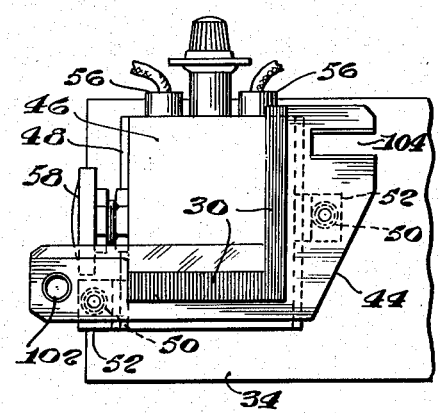
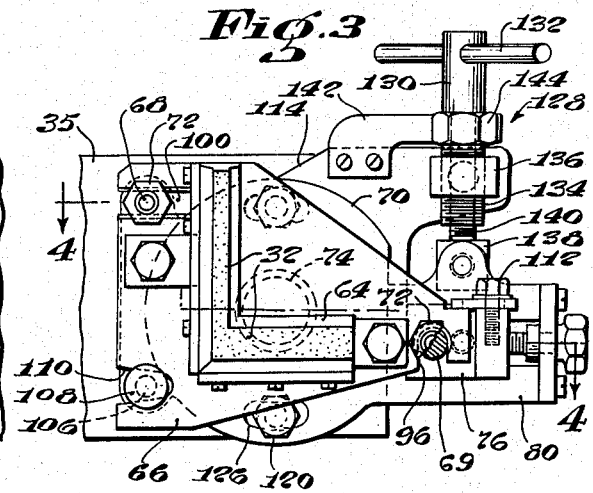
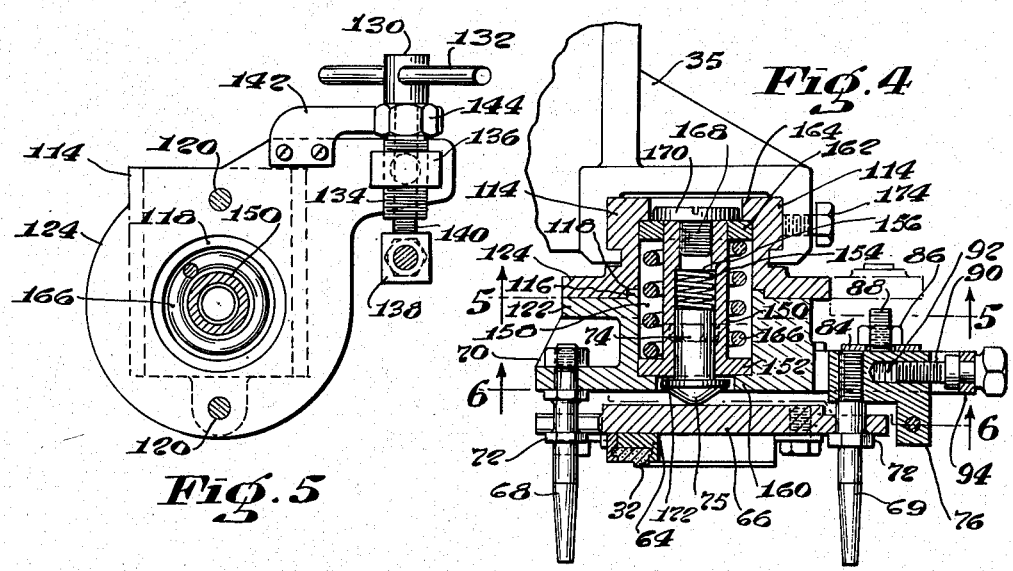
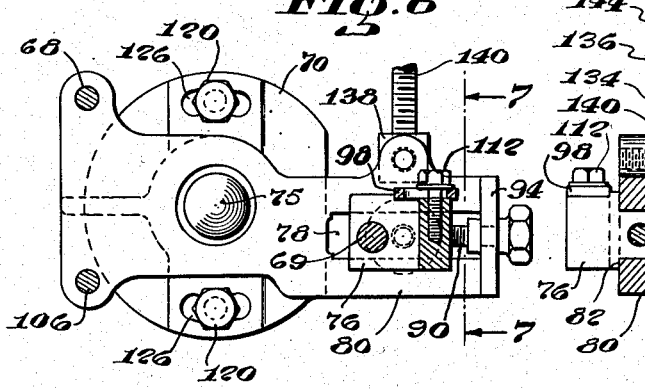
INVENTOR.
Stanley R. Howard
BY J. Stanley Churchill
ATTORNEY Nov. 14, 1950     S. R. HOWARD     2,529,732
CONTAINER FORMING MACHINE Filed April 15, 1947     3 Sheets-Sheet 3

INVENTOR.
Stanley R. Howard
BY
J. Stanley Churchill
ATTORNEY

Patented Nov. 14, 1950

2,529,732

UNITED STATES PATENT OFFICE 2,529,732

CONTAINER FORMING MACHINE

Stanley R. Howard, Milton, Mass., assignor to Pneumatic Scale Corporation, Limited, Quincy, Mass., a corporation of Massachusetts Application April 15, 1947, Serial No. 741,642

17 Claims. (Cl. 154—1)

This invention relates to a container forming machine and particularly to a machine for forming, filling and sealing tea and similar bags.

The invention has for an object to provide a novel and improved container forming machine having novel reciprocatory heat sealing apparatus in which provision is made for mounting the cooperating sealing members in a manner such as to effect self-alignment and pressure equalization of the sealing members during the sealing operation whereby to obtain efficient and superior seals for the container.

With this general object in view and such others as may hereinafter appear the invention consists in the container forming machine and in the various structures, arrangements and combinations of parts hereinafter described and particularly defined in the claims at the end of this specification.

Figure 1:
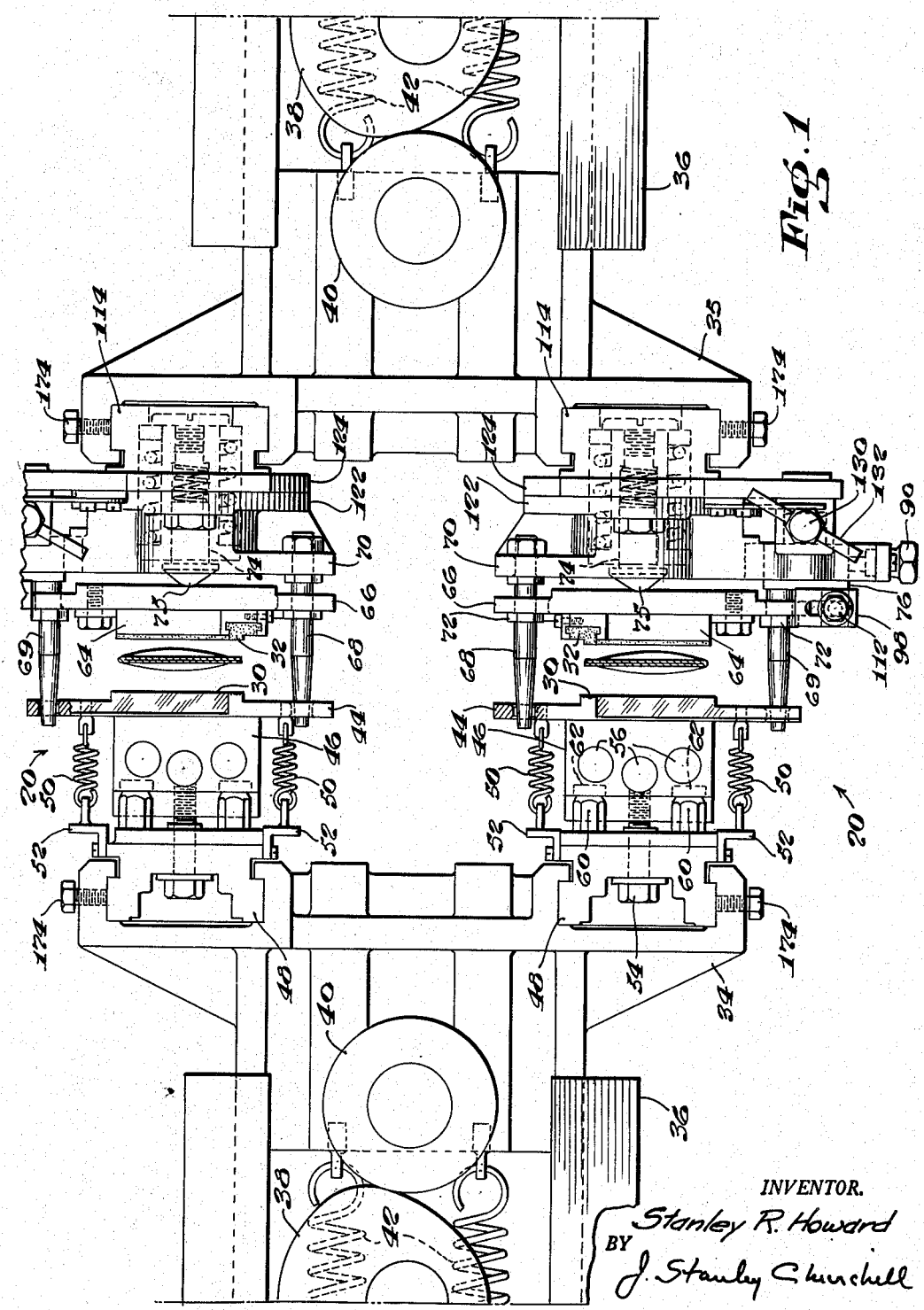

In the drawings illustrating the preferred embodiment of the invention, Fig. 1 is a plan view of heat sealing or pressure applying apparatus embodying the present invention in a duplex type machine for forming, filling and sealing the bags; Fig. 2 is a front elevation of one of the cooperating heat sealing elements shown in Fig. 1; Fig. 3 is a similar view of the opposed heat sealing element adapted for cooperation with the sealing element shown in Fig. 2; Fig. 4 is a cross sectional view taken on the line 4—4 of Fig. 3 and illustrating the mounting for the sealing element; Figs. 5 and 6 are cross sectional views taken on the lines 5—5 and 6—6 respectively of Fig. 4; Fig. 7 is a cross sectional detail view taken on the line 7—7 of Fig. 6; and Fig. 8 is a perspective view diagrammatically illustrating a duplex type machine for forming, filling and sealing tea bags and embodying the present invention.

In general, the present invention contemplates a container sealing machine provided with novel heat sealing apparatus embodying cooperating heat sealing or pressure applying elements particularly adapted for sealing together contacting portions of a relatively thin porous heat sealable fibrous bag forming material. In the commercial tea bagging machines now upon the market difficulty has been experienced in obtaining accurately the alignment of and equalized pressure between opposed sealing elements utilized in producing heat seal tea bags.

In accordance with the present invention provision is made for mounting one of the cooperating sealing members in a manner such that it may be moved laterally with relation to its supporting member to permit it to align itself in exact registration with the other sealing member during the sealing operation, and, provision is also made for mounting the second or opposed sealing member in a manner such that it may tilt with relation to its supporting member to enable it to conform to the plane of said first sealing member whereby to obtain an equalization of pressure over the entire area to be sealed thus producing a substantially continuous and uniform seal between the two layers of the thin heat sealable bag forming material. Provision is also made in the preferred embodiment of the invention for enabling one of the sealing members to be angularly and laterally adjusted with relation to its supporting member in order to initially align the sealing member in registered relation with its opposed sealing member in a convenient and efficient manner as will be hereinafter more fully described.

Figure 8:
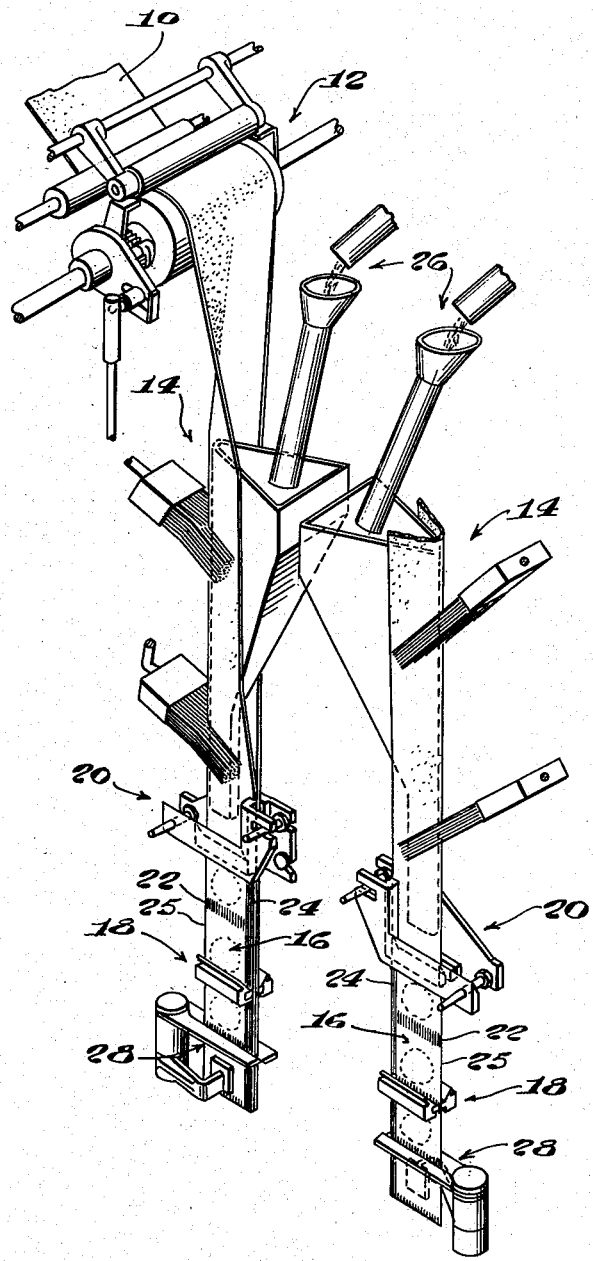

Referring now to the drawings, the illustrated embodiment of the invention is adapted for use in a commercial machine for forming, filling and sealing paper tea bags, such as the machine illustrated and described in the United States Patent No. 2,385,229 issued to Patterson, September 18, 1945, and, as herein shown, see Fig. 8, such machines may be arranged in duplex form for simultaneously producing two strips of connected and filled tea bags. In the operation of such machines a web of bag forming material 10 is withdrawn from a supply roll thereof by withdrawing mechanism indicated generally at 12 and advanced over bag forming mechanism 14 which operates to fold the web longitudinally along a medial line to bring together the two half sections of the web preparatory to forming a strip of connected bag sections 16. The bag forming material is preferably drawn over the bag forming mechanism 14 by gripping and advancing mechanism 18 operative to advance the strip 16 one bag length each cycle of operation and to present the strip in operative relation to the bag sealing mechanism, indicated generally at 20 arranged to seal the strip simultaneously along a transverse zone 22 and an adjacent longitudinal zone 24 during each sealing operation to form a series of connected bag sections closed on one side by the folded edge 25 and heat sealed along the remaining side and at the top and bottom as above described. Provision is also made in such machines for depositing successive charges of the commodity into successive of the uppermost bag sections as it is being formed by tea feeding mechanism indicated generally at 26, the feeding mechanism operating in timed relation to the operation of the strip advancing and heat sealing mechanisms 18, 20 respectively, and, in the operation of the machine, the open top of a bag which has been provided with a charge of the commodity during one cycle of operation is closed during a succeeding cycle. Thereupon, the strip is intermittently advanced to bag severing mechanism, indicated generally at 28 which operates to sever the strip through successive transverse sealed portions to form individual filled and sealed bags.

Referring now to Fig. 1, the present heat sealing apparatus includes duplex units 20 arranged for simultaneous operation upon two strips of bag forming material, and, as herein shown, each unit includes a pair of cooperating L-shaped sealing members 30, 32 mounted for horizontal reciprocation into and from engagement with the intermittently advanced bag forming strip to press and heat seal successive transverse portions 22 and adjacent marginal portions 24 of the strip thus forming a series of connected bag sections.

The duplex units 20, are carried by opposed horizontally reciprocal brackets 34, 35 slidably mounted in guide brackets 36 attached to the machine frame, and, each bracket 34, 35 is arranged to be reciprocated by a similar cam 38 arranged to cooperate with a roller 40 carried by the slide bracket in a manner similar to that shown in Patent No. 2,385,229 above referred to. Each slide bracket 34, 35 is arranged to be retracted by springs 42 which hold the roller 40 against its cam.

One of the sealing members 30 of each sealing unit is heated and, as herein shown, comprises a serrated or knurled faced metallic member formed integrally with a laterally movable or floatingly mounted aligning plate 44 arranged to bear against a heating block 46 attached to a supporting member 48 mounted for vertical adjustment in the bracket 34. As herein shown, the plate 44 is held flat against the face of the heating block 46 by springs 50 connected to angle members 52 attached to the supporting member 48 so that in operation the plate is free to be shifted in any direction in a plane substantially parallel to the cooperating member 32 or in a plane substantially at right angles to the line of reciprocation whereby to permit it to align itself with the cooperating sealing member 32. The heating block 46 may be attached to its supporting member by bolts 54 and may be provided with the usual electrical heating elements 56 including a thermostat 58. The supporting member 48 is further provided with bearing pins 60 extending therefrom and arranged to engage heat resisting inserts 62 provided in the rear faces of the block in order to reduce heat transfer from the block to its supporting member.

The cooperating sealing member 32, comprises a yieldable pad which may comprise a rubber or equivalent material made in suitably formed sections provided with tongued portions arranged to be received in correspondingly grooved portions formed in a retaining member 64 which is secured to a tiltingly or floatingly mounted plate 66 adapted to conform itself in parallel face to face relation to the opposed plate 44 upon initial engagement of the sealing members 30, 32 during the sealing operation. As herein shown, the plate 66 is supported for longitudinal and slight tilting movement on registration pins 68, 69 attached to and extending from a rotatably adjustable supporting member 70, the plate being normally yieldingly maintained against shouldered portions 72 of the registering pins by a substantially centrally disposed spring pressed pin 74 extending from the supporting member 70 and engageable with the rear face of the plate 66. As illustrated in Fig. 1, the registration pins 68, 69 are tapered at their forward ends and extend into suitable openings formed in the opposed plate 44 so that in operation when opposed sealing members are moved toward each other during the sealing operation, the plate 44 is caused to move in any direction in a vertical plane relative to the face of the heating block 46 to align the sealing member 30 in registration with the sealing member 32.

As best shown in Figs. 3 and 6 provision is made in the preferred embodiment of the invention for initially laterally adjusting the supporting plate 66 and the sealing member 32 carried thereby with relation to its supporting member 70 in order to initially dispose the L-shaped sealing member 32 substantially in lateral alignment with its cooperating sealing member 30 and also with relation to the web or strip of bag forming material to be sealed. As herein shown, one of the registration pins, 69, is carried by an adjustable block 76 laterally movable in a slot 78 formed in an extension 80 of the supporting member 70. The block 76 is retained in the slot 78 by a shouldered portion 82 formed on one side and on the opposite side by a washer 84 and nut 86 cooperating with a threaded extension 88 of the block. The block is arranged to be adjusted in the slot 78 by a screw 90 cooperating with a tapped hole 92 in the block, the screw 90 being supported in an end plate 94 attached to the extension 80 and in a manner such as to restrain the screw from axial movement during rotation thereof. Thus, in the operation of the device, the plate 66 mounted on the pin 69 will be moved laterally therewith upon adjustment of the block 76 as described.

As herein shown, the plate 66 is mounted on the pins 68, 69 in a manner such as to facilitate removal and replacement thereof when replacing a worn sealing member or when a different size is to be employed, and, as best shown in Fig. 3, the plate 66 is preferably hooked over the laterally movable pin 69, the plate being provided with a vertical slot 96 open at one end and retained in assembled relation with the pin 69 by a latch 98 carried by the block 76 and engageable with the upper edge of the plate 66 adjacent the slot 96. The registration pin 68 supporting the other side of the plate 66 is fixed in the supporting member 70 so that in order to permit lateral movement of the plate with relation to the pin 68 during adjustment, the plate is provided with a horizontally extended slot 100 open at one end and arranged to embrace the fixed registration pin 68.

As shown in Fig. 2, the cooperating plate 44 is provided with a round opening 102 for receiving the registration pin 68 and a horizontally extended slot 104 corresponding to the slot 100 to permit adjustment of the sealing members as described. As herein described, the plate 66 is yieldingly urged against shouldered portions 72 of the registering pins 68, 69, and, as shown in Fig. 3, a third pin or stud 106 secured in the supporting member 70 is provided with a flanged head or shouldered portion 108 flush with the shoulders 72 in order to provide a third bearing point for the plate 66 in its forwardly urged position, the plate being provided with a slotted portion 110 to accommodate the pin 106. Thus, when it is desired to replace the plate 66 and its sealing member 32, the screw 112 may be loosened and the latch 98 swung to one side or moved outwardly whereupon the hooked end of the plate may be lifted off the pin 69 and then withdrawn from the pins 68 and 106 by virtue of the slotted portions 100, 110 the latter providing sufficient clearance to permit pivotal movement of the plate on the pin 68 when the plate is lifted off the pin 69.

From the description thus far it will be observed that the plate 66 and the sealing member 32 carried thereby, may be initially adjusted laterally with respect to the cooperating sealing member 30 and its plate 44 and that the sealing member 30 may be brought into accurate alignment with the sealing member 32 during the sealing operation by the engagement of plate 44 with the registration pins 68, 69.

Provision is further made for initially angularly adjusting the L-shaped sealing member 32 in order to initially align the L substantially vertical with relation to its cooperating L-shaped sealing member 30 and the web or strip to be sealed and, as illustrated in Figs. 4, 5 and 6 this is accomplished by bodily rotating the supporting member 70 with relation to the vertically adjustable support 114 carried by the reciprocatory slide bracket 35. As herein shown, the member 70 is provided with a short hub 116 arranged to fit into a correspondingly recessed portion 118 formed in the member 114 and the members are adjustably secured together by bolts 120 extending through the flanges 122, 124 respectively of the members 70 and 114, the member 70 being provided with arcuate slots 126 to permit rotary adjustment thereof.

The supporting member 70 and the parts carried thereby are rotated bodily as a unit by adjusting means indicated generally at 128 extending between the members 70 and 114 and, as herein shown, the connecting means includes an adjusting screw 130 having a handle 132 and provided with an exteriorly threaded portion 134 cooperating with a swivel 136 carried by the vertically adjustable support 114, and, a pivotal connection 138 carried by the angularly adjustable member 70 and having a threaded portion 140 cooperating with an interiorly threaded portion of the adjusting screw 130. Thus, when it is desired to adjust the member 70 the bolts 120 are first loosened and upon rotation of the adjusting screw 130 the member 70 may be rocked with relation to its support 114 to dispose the L-shaped sealing member in the desired angular position whereupon the bolts 120 may again be tightened. In order to hold the adjusting screw 130 in its adjusted position a spring arm 142 carried by the member 114 is arranged to engage an adjacent face of a hexagonal shoulder 144 formed on the adjusting screw, the spring arm 142 being capable of yielding to permit rotation of the screw during adjustment.

Referring now particularly to Fig. 4, the spring pressed pin 74 is provided with a rounded or convex head 75 to provide a pivotal bearing point against the rear face of the floatingly or tiltingly mounted plate 66 and, as herein shown, the pin is preferably disposed relative to the plate 66 and the sealing pad 32 carried thereby so as to bear against a substantially central portion of the pad 32 or at a point such as to effect a substantially uniform bearing pressure over the entire area of the L-shaped pad. Provision is made for mounting the pin 74 in a manner such as to provide but a relatively slight yielding pressure during the initial period of engagement of the sealing pad 32 with the sealing member 30 in order to permit the plate 66 to tilt to conform itself to a plane uniformly parallel to the member 30 when the plate 66 is moved away from engagement with the shoulders 72, 108 of the supporting pins during the initial engagement of the sealing members, and, thereafter a relatively greater and preferably yieldable pressure is applied by the pin 74 against the plate 66 to produce the heat seal.

As best shown in Fig. 4, the pressure applying pin 74 is slidingly mounted in a tubular member 150 having a flanged portion 152 at its forward end and is yieldingly urged against the rear face of the plate 66 by an initial compression spring 154 interposed between the inner end of the pin and an interior shoulder 156 of the member 150. The member 150 is itself slidingly mounted in a chamber or bore 158 formed in the adjoining portions 70, 114, the flanged portion 152 fitting within the bore 158 and bearing against a shouldered portion 160 formed in the member 70. The other end of the member 150 is slidingly supported in a collar 162 retained against a shouldered portion 164 formed in the supporting member 114, by a main compression spring 166 interposed between the flange 152 and collar 162. The end of the tubular member 150 is provided with a screw 168 having a large diameter head 170 extending over the inner edge of the collar 162 to hold the parts in assembled relation.

With this construction it will be seen that prior to engagement of the sealing members 30, 32, the head portion 75 of the pin 74 is extended slightly beyond the face 172 of the flange 152 so that upon initial engagement of the sealing members 30, 32 the initial compression spring 154 will yield and the plate 66 will retract from the shoulders 72, 108 thereby enabling the plate 66 to tilt to conform itself to the plane of the opposed sealing member 30 by virtue of the floating mounting and the pivotal bearing pressure of the head 75. Thereafter, the underside of the head 75 of the pressure applying pin will engage the face 172 of the flanged portion 152 whereupon the pin 74 together with the slidingly mounted tubular member 150 will be retracted against the pressure of the main compression spring 166 to perform the sealing operation.

From the above description it will be observed that provision is made in the present heat sealing apparatus for first initially adjusting opposed sealing units vertically in their respective supporting and horizontally reciprocal slide brackets 34, 35, suitable provision being made for locking the units in their vertically adjusted position, as by set screws 174. It will be further observed that provision is made for initially adjusting the sealing pad 32 both laterally and angularly to align the same with relation to the web to be sealed and with relation to its cooperating sealing member. It will be also observed that accurate registration of opposed sealing members is assured by mounting one of the members, 30, to be capable of movement in any direction in a vertical plane with relation to its supporting member and by the provision of registration pins in the other member engageable with openings in said first member to effect such registration. It will be still further observed that uniform sealing pressure throughout the entire area of the L-shaped sealing member is assured by the provision of a tiltable mounting for the sealing pad 32 and a single substantially centrally disposed and yieldingly mounted pressure applying pin having a pivotal bearing point cooperating with the pad.

While the preferred embodiment of the invention has been herein illustrated and described, it will be understood that the invention may be embodied in other forms within the scope of the following claims.

Having thus described the invention, what is claimed is:

1. In a container forming machine, in combination, a pair of cooperating sealing members, one of said sealing members being supported for shifting movement in any direction in a plane substantially parallel to the other sealing member, and means associated with said other sealing member and engageable with said first member for causing the latter to be shifted into alignment therewith during the sealing operation, and means for supporting said one sealing member including a backing member, and means for yieldably retaining the sealing member in slidable engagement with the backing member to permit said shifting movement.

2. In a container forming machine, in combination, a pair of cooperating reciprocatory sealing members, one of said sealing members being supported for shifting movement in any direction in a plane substantially at right angles to the line of reciprocation and provided with registration openings, and registration pins extended through the other sealing member and engageable with said openings for shifting said first member into alignment therewith, and means for supporting said one sealing member including a backing member, and means for yieldably retaining the sealing member in slidable engagement with the backing member to permit said shifting movement.

3. In a tea bagging machine of the character described, in combination, means for supporting and intermittently advancing a strip of folded bag forming material, two cooperating sealing members for sealing the bag forming material to form bag sections, one of said sealing members being supported for shifting movement in any direction in a plane substantially parallel to the other sealing member, and means associated with said other sealing member for shifting said first member into alignment therewith during the sealing operation, and means for supporting said one sealing member including a backing member, and means for yieldably retaining the sealing member in slidable engagement with the backing member to permit said shifting movement.

4. In a container forming machine, in combination, a pair of cooperating sealing members, one of said sealing members being supported to be capable of tilting to conform to the plane of the other sealing member upon initial engagement therewith whereby to enable the sealing operation to be performed with uniform sealing pressure over the area to be sealed, the second sealing member being mounted for shifting movement relative to said one sealing member, and guide rods extended through both sealing members for supporting said tiltable sealing member and for effecting shifting of the second sealing member into alignment therewith upon movement into sealing engagement.

5. In a container forming machine, in combination, a pair of cooperating sealing members, one of said members being floatingly supported and capable of tilting to conform to the plane of the other sealing member upon initial engagement therewith, and pressure applying means including a yieldingly mounted and substantially centrally disposed pressure member engageable with said floatingly supported member whereby to enable the sealing operation to be performed with uniform sealing pressure over the area to be sealed, the second sealing member being mounted for shifting movement relative to said one sealing member, and guide rods extended through both sealing members for supporting said tiltable sealing member and for effecting shifting of the second sealing member into alignment therewith upon movement into sealing engagement.

6. In a container forming machine, in combination, a pair of cooperating sealing members, one of said members being floatingly supported and capable of tilting to conform to the plane of the other sealing member upon initial engagement therewith, and pressure applying means including a yieldingly mounted and substantially centrally disposed pressure member engageable with said floatingly supported member, said pressure member having a convex head to permit said tilting movement thereby to enable the sealing operation to be performed with a uniform sealing pressure over the area to be sealed, the second sealing member being mounted for shifting movement relative to said one sealing member, and guide rods extended through both sealing members for supporting said tiltable sealing member and for effecting shifting of the second sealing member into alignment therewith upon movement into sealing engagement.

7. In a machine of the character described, in combination, a pair of cooperating sealing members, one of said sealing members being supported to be capable of tilting to conform to the plane of the other sealing member upon initial engagement therewith, and pressure applying means including a substantially centrally disposed and yieldingly mounted pin having a rounded head engageable with the rear face of said one sealing member, the second sealing member being mounted for shifting movement relative to said one sealing member, and guide rods extended through both sealing members for supporting said tiltable sealing member and for effecting shifting of the second sealing member into alignment therewith upon movement into sealing engagement.

8. In a container forming machine, in combination, a pair of cooperating sealing members, one of said sealing members being supported for shifting movement in any direction in a plane substantially parallel to the other sealing member, means associated with the second sealing member including guide rods extending through both sealing members and adapted for shifting said first member into alignment therewith, said second member being supported on said rods to be capable of tilting to conform to the plane of said first member upon initial engagement therewith whereby to enable the sealing operation to be performed with a uniform sealing pressure over the area to be sealed.

9. In a container forming machine, in combination, a pair of cooperating sealing members, one of said sealing members being supported for shifting movement in any direction in a plane substantially parallel to the other sealing member, means associated with the second sealing member including guide rods extending through both sealing members and adapted for shifting said first member into alignment therewith, said second member being supported on said rods to be capable of tilting to conform to the plane of said first member upon initial engagement therewith, and pressure applying means including a substantially centrally disposed and yieldingly mounted pin having a rounded head engageable with the rear face of said second sealing member whereby to enable the sealing operation to be performed with a uniform sealing pressure over the area to be sealed.

10. In a container forming machine, in combination, a pair of cooperating sealing members, one of said sealing members being supported to be capable of tilting to conform to the plane of the other sealing member upon engagement therewith, and pressure applying means including a substantially centrally disposed pressure member having a relatively low compression spring effective during initial engagement of the sealing members to permit said conforming movement, and having a relatively high compression spring effective after said conforming movement for applying the sealing pressure, the second sealing member being mounted for shifting movement relative to said one sealing member, and guide rods extended through both sealing members for supporting said tiltable sealing member and for effecting shifting of the second sealing member into alignment therewith upon movement into sealing engagement.

11. In a container forming machine, in combination, a pair of cooperating sealing members, one of said sealing members being supported to be capable of tilting to conform to the plane of the other sealing member upon initial engagement therewith, the second sealing member being mounted for shifting movement relative to said one sealing member, and guide rods extended through both sealing members for supporting said tiltable sealing member and for effecting shifting of the second sealing member into alignment therewith upon movement into sealing engagement, and means for enabling said one sealing member to be adjusted laterally with respect to its support to effect preliminary approximate alignment thereof with respect to its cooperating sealing member.

12. In a container forming machine, in combination, a pair of cooperating sealing members, one of said sealing members being supported to be capable of tilting to conform to the plane of the other sealing member upon initial engagement therewith, the second sealing member being mounted for shifting movement relative to said one sealing member, and guide rods extended through both sealing members for supporting said tiltable sealing member and for effecting shifting of the second sealing member into alignment therewith upon movement into sealing engagement, and means for enabling said one sealing member to be adjusted angularly with respect to its support to effect preliminary approximate alignment thereof with respect to its cooperating sealing member.

13. In a container forming machine, in combination, a pair of cooperating reciprocatory sealing members, one of said sealing members being supported to be capable of tilting to conform to the plane of the other sealing member upon initial engagement therewith, the second sealing member being mounted for shifting movement relative to said one sealing member, and guide rods extended through both sealing members for supporting said tiltable sealing member and for effecting shifting of the second sealing member into alignment therewith upon movement into sealing engagement, means for initially adjusting said one sealing member laterally with respect to its support, and means for initially adjusting said one sealing member angularly with respect to its support whereby to effect preliminary approximate alignment of said one sealing member with respect to its cooperating sealing member.

14. In a container forming machine, in combination, a pair of cooperating reciprocatory sealing members, one of said sealing members being supported to be capable of tilting to conform to the plane of the other sealing member upon initial engagement therewith, means for initially adjusting said one sealing member laterally with respect to its support, and means for initially adjusting said one sealing member angularly with respect to its support whereby to effect preliminary approximate alignment of said one sealing member with respect to its cooperating sealing member, said second sealing member being mounted for shifting movement in any direction in a plane substantially at right angles to the line of reciprocation, and means associated with said one sealing member including guide rods extending through both sealing members and adapted for shifting said cooperating member into alignment therewith.

15. In a container forming machine, in combination, a pair of cooperating sealing members, one of said members being supported for shifting movement in any direction in a plane substantially parallel to the plane of the other sealing member, means associated with the second sealing member including guide rods extending through both sealing members and adapted for shifting said first member into registered alignment therewith during the sealing operation, said second sealing member being supported on said rods to be capable of tilting to conform to the plane of said first member upon engagement therewith, and pressure applying means engageable with said second sealing member including a substantially centrally disposed pressure member having a relatively low compression spring effective during initial engagement of the sealing members to permit said conforming movement, and having a relatively high compression spring effective after said conforming movement for applying the sealing pressure.

16. In a container forming machine, in combination, a pair of cooperating sealing members, and means for mounting one of said sealing members to be capable of tilting to conform to the plane of its cooperating sealing member, said means including guide rods on which said one member is mounted for longitudinal and slight tilting movement, stop means for limiting the forward movement of said one sealing member on the guide rods, a spring pressed and substantially centrally disposed round head pin engageable with said one member for yieldingly urging the same against said stop means, said one member being retracted from said stop means and free to tilt about said pin upon engagement with its cooperating sealing member, the second sealing member being mounted for shifting movement relative to said one sealing member, said guide rods being tapered at their outer ends and engageable with openings in said second member to effect shifting thereof into alignment with said one member upon movement into sealing engagement.

17. In a container forming machine, in combination, a pair of cooperating sealing members, and means for mounting one of said sealing members to be capable of tilting to conform to the plane of its cooperating sealing member, said means including guide rods on which said one member is mounted for longitudinal and slight tilting movement, stop means for limiting the forward movement of said one sealing member on the guide rods, a spring pressed and substantially centrally disposed round head pin engageable with said one member for yieldingly urging the same against said stop means, said one member being retracted from said stop means and free to tilt about said pin upon engagement with its cooperating sealing member, said spring pressed pin being effective to apply a relatively low pressure during initial engagement of the sealing members to permit said conforming movement and to apply a relatively high pressure after said conforming movement for applying the sealing pressure, the second sealing member being mounted for shifting movement relative to said one sealing member, said guide rods being tapered at their outer ends and engageable with openings in said second member to effect shifting thereof into alignment with said one member upon movement into sealing engagement.

STANLEY R. HOWARD.

REFERENCES CITED

The following references are of record in the file of this patent:

UNITED STATES PATENTS

| Number | Name | Date |
|---|---|---|
| 1,645,248 | Lower | Oct. 11, 1927 |
| 1,803,779 | Stevens | May 5, 1931 |
| 1,997,268 | Scharpf | Apr. 9, 1935 |
| 2,140,117 | Salfisberg | Dec. 13, 1938 |
| 2,200,971 | Sonneborn | May 14, 1940 |
| 2,385,229 | Patterson | Sept. 18, 1945 |
| 2,414,157 | Marziani | Jan. 14, 1947 |
| 2,434,657 | Irmscher | Jan. 20, 1948 |